US009804942B2

(12) United States Patent
Hayden et al.

(10) Patent No.: US 9,804,942 B2
(45) Date of Patent: Oct. 31, 2017

(54) SAFETY NODE IN INTERCONNECT DATA BUSES

(71) Applicant: ANALOG DEVICES, INC., Norwood, MA (US)

(72) Inventors: John A. Hayden, Sharon, MA (US); Richard F. Grafton, Abington, MA (US); Matthew Puzey, Norwood, MA (US); Gordon Cheung, Sudbury, MA (US); James Frank Galeotos, Canton, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 127 days.

(21) Appl. No.: 14/717,894

(22) Filed: May 20, 2015

(65) Prior Publication Data
US 2015/0355989 A1 Dec. 10, 2015

Related U.S. Application Data

(60) Provisional application No. 62/010,014, filed on Jun. 10, 2014.

(51) Int. Cl.
| | | |
|---|---|---|
| *G06F 11/00* | (2006.01) | |
| *G06F 11/30* | (2006.01) | |
| *G06F 11/07* | (2006.01) | |
| *G06F 13/364* | (2006.01) | |
| *G06F 13/42* | (2006.01) | |
| *G06F 13/40* | (2006.01) | |

(52) U.S. Cl.
CPC ...... *G06F 11/3027* (2013.01); *G06F 11/0745* (2013.01); *G06F 11/0757* (2013.01);
(Continued)

(58) Field of Classification Search
CPC ............ G06F 11/3027; G06F 11/0745; G06F 11/0793; G06F 11/0757; G06F 13/4027; G06F 13/364; G06F 13/4282
(Continued)

(56) References Cited

U.S. PATENT DOCUMENTS

| | | |
|---|---|---|
| 7,043,589 B2 | 5/2006 | Chang et al. |
| 2006/0195589 A1* | 8/2006 | Vaitl ...................... H04L 67/14 709/227 |

(Continued)

FOREIGN PATENT DOCUMENTS

CN 103064817 4/2013

OTHER PUBLICATIONS

Rush by, John, "A Comparison of Bus Architectures for Safety-Critical Embedded Systems," NASA/CR-2003-212161, SRI International, Menlo Park, California, Mar. 2003, Langley Research Center, Hampton, Virginia 23681-2199, 63 pages.
(Continued)

*Primary Examiner* — Yair Leibovich
(74) *Attorney, Agent, or Firm* — Patent Capital Group

(57) ABSTRACT

In safety-critical computer systems, fault tolerance is an important design requirement. Data buses for on-chip interconnection in these processor-based systems are exposed to risk arising from faults in the interconnect itself or in any of the connected peripherals. To provide sufficient fault tolerance, a safety node is inserted between an upstream master section and a downstream slave section of an on-chip bus hierarchy or network. The safety node provides a programmable timeout monitor for detecting a timeout condition for a transaction. If timeout has occurred, the safety node transmits a dummy response back to the master, assumes the role of a master, and waits for the slave device to respond. Furthermore, the safety node rejects any subsequent requests by any of the masters on the upstream section by transmitting a dummy response to those subsequent requests, thus enabling these masters to avoid deadlock or stall.

20 Claims, 8 Drawing Sheets

(52) U.S. Cl.
CPC ........ *G06F 11/0793* (2013.01); *G06F 13/364* (2013.01); *G06F 13/4027* (2013.01); *G06F 13/4282* (2013.01)

(58) Field of Classification Search
USPC .......................................................... 714/13
See application file for complete search history.

(56) References Cited

U.S. PATENT DOCUMENTS

| | | | | |
|---|---|---|---|---|
| 2009/0164681 | A1* | 6/2009 | Elhamias | G06F 13/385 710/117 |
| 2011/0320690 | A1* | 12/2011 | Petersen | G06F 3/0611 711/103 |
| 2015/0082080 | A1* | 3/2015 | Lin | G06F 11/0745 714/5.1 |
| 2015/0254193 | A1* | 9/2015 | Priest | G06F 13/385 715/835 |

OTHER PUBLICATIONS

Nikolic, Zoran et al., "TI Gives Sight to Vison-Enabled Automotive Technologies", White Paper, Oct. 2013, © 2013, Texas Instruments Incorporated, 12 pages.
OA1 issued in CN Patent Application Serial No. 201510315285.2 dated Aug. 21, 2017, 11 pages.

* cited by examiner

SAFETY NODE IN INTERCONNECT DATA BUSES

PRIORITY DATA

This patent application receives benefit from or claims priority to U.S. Provisional Application 62/010,014 entitled "SAFETY NODE IN INTERCONNECT DATA BUSES" and filed on Jun. 10, 2014, which is hereby incorporated by reference in its entirety.

TECHNICAL FIELD OF THE DISCLOSURE

The present disclosure relates generally to interconnect data buses and, more particularly, to a safety node for these interconnect data buses.

BACKGROUND

Over the past couple of decades, more and more systems have come to rely on electronics to provide safety-critical functions such as control. These electronics are used in a variety of safety-critical systems such as energy systems, aerospace systems, and automotive systems. Electronics are used in airplanes for many years to control the aircraft and ensure various components are operational. Also, electronics are used in many modern road vehicles for common features such as cruise control, anti-lock braking systems, airbags, and even more electronics are used in hybrid and electric cars on the roads today.

OVERVIEW

In safety-critical computer systems, fault tolerance is an important design requirement. Data buses for on-chip interconnection in these processor-based systems are exposed to risk arising from faults in the interconnect itself or in any of the connected peripherals. To provide sufficient fault tolerance, a safety node is inserted between an upstream master section and a downstream slave section of an on-chip bus hierarchy or network.

The safety node provides a (programmable) timeout monitor for detecting a timeout condition for a transaction. If timeout has occurred, the safety node transmits or triggers a prearranged dummy response back to the master, which frees the upstream section master to avoid deadlock and perform subsequent transactions. The safety node then assumes the role of a master of the downstream section, and waits for the slave device to respond. Furthermore, the safety node rejects any subsequent requests by any of the masters on the upstream section by transmitting or triggering an immediate dummy response to those subsequent requests, thus enabling these masters to avoid deadlock or stall.

The prearranged response can include either or both of (a) in-band response signaling within the bus protocol, and/or (b) side-band response outside the bus protocol, such as an interrupt. Response within the protocol can include a legal slave response which allows the master to complete the current transaction legally within the master protocol, and may be any of: an error response, indicating the transaction was unsuccessful, a partial-completion response, indicating the transaction was partially completed and may have been split into a complete part and an incomplete part, or a normal-completion response. If a normal-completion in-band response is issued, the in-band response can be accompanied by a side-band response (error interrupt) so that the master is notified of the timeout.

DESCRIPTION OF EXAMPLE EMBODIMENTS OF THE DISCLOSURE

Understanding of Fault Tolerance

Figure 1:
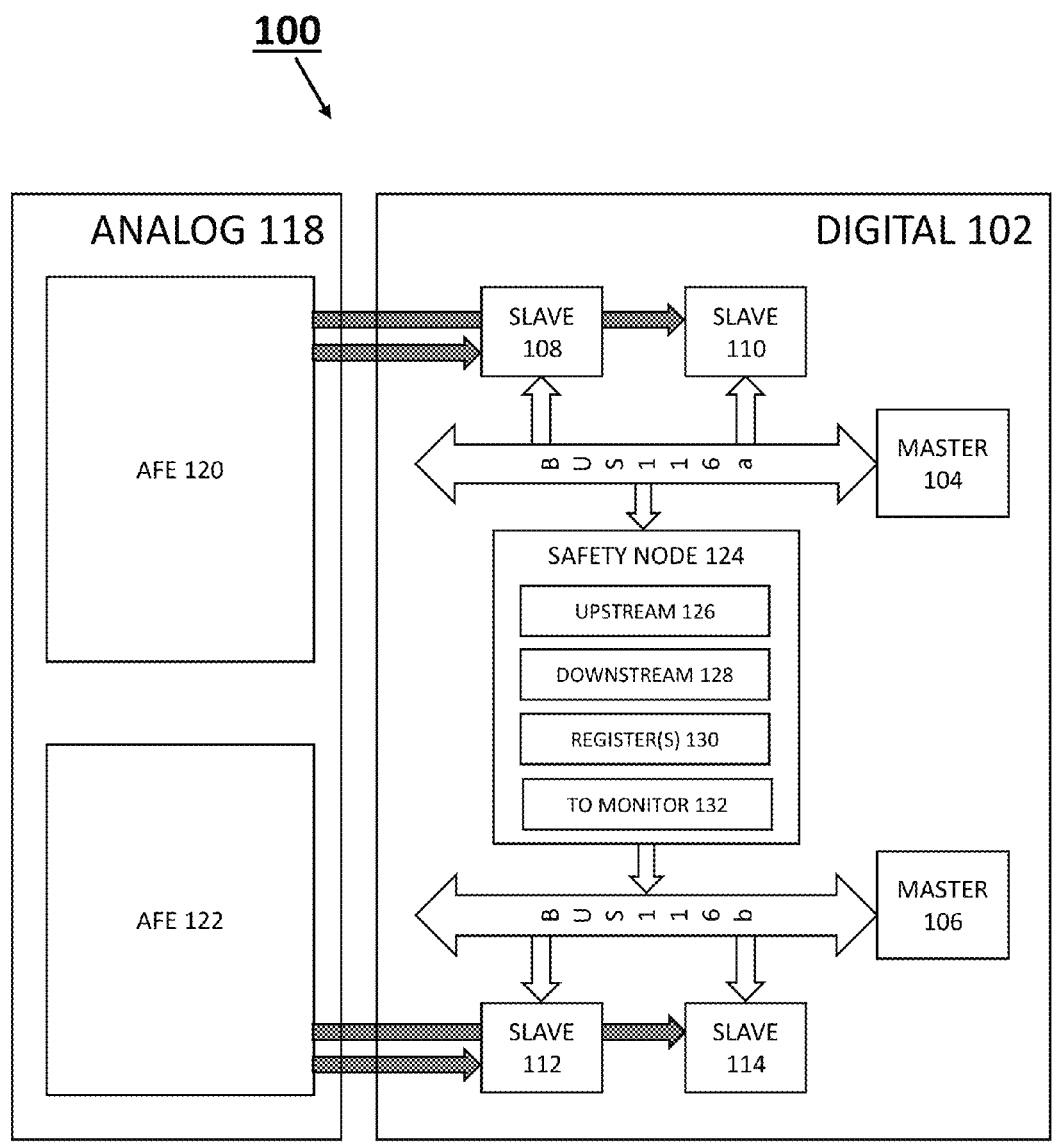
FIG. 1 is a simplified schematic diagram illustrating an exemplary processor-based system having a safety node, according to some embodiments of the disclosure.

Components and programs in a computer system, while they are reliable and operational most of the time, will fail inevitably at one point or another. Failures can be caused by hardware problems or software errors. Fault tolerance is the property that enables a computer system to continue operating properly in the event of one or more faults in the system. Without fault tolerance, the faults can cause a total breakdown, which could lead to disastrous consequences in safety-critical systems. Typically, computer system designers and architects try to design computer systems which, in the event of one or more faults, can continue to operate at reduced capacity and/or can degrade gracefully such that a recovery action can be taken.

Many of these safety-critical computer systems combine processors and peripherals to provide safety-critical functions such as power and engine control. To provide rules and guidance to various industries on how to design safe equipment and systems, international standardization bodies have developed standards such as, IEC 61508, titled "Functional Safety of Electrical/Electronic/Programmable Electronic Safety-related Systems," and ISO 26262, titled "Road Vehicles—Functional safety." These standards define risks and normative behaviors of electronics requirements of safety-critical systems in a variety applications where electronics provide a safety-critical role. Because these electronics are important to human and environmental safety and electronics are bound to have faults, fault-tolerance is a particularly important design requirement addressed by these standards. For this reason, these International standards provide norms and guidance dictating how the safety-critical system should behave when there is one or more faults in the system or how the system should to continue operating properly in the event of the one or more faults within the system.

While system designers and architects strive to meet fault tolerance design requirements, it is also important for designers and architects provide solutions which are not prohibitively expensive to implement.

Faults in Interconnect Data Buses

In safety-critical systems, industry-standard and proprietary data buses for on-chip interconnection in processor-based systems are exposed to risk arising from faults in the interconnect itself or in any of the connected peripherals. Hazards to be addressed in safety-critical systems include: shorts and opens in interconnect, failures in hardware peripheral slaves, deadlocks, starvation or saturation of traffic on bus segments, programming or protocol errors at higher communications layers. These hazards would result in a timeout error, i.e., lack of expected response, or a delayed expected response.

These industry standard and proprietary buses include buses following the open standard, on-chip interconnection Advanced Microcontroller Bus Architecture (AMBA) specification for the connection and management of functional blocks in a System-on-Chip (SoC). Typically, such buses, e.g., the widely-used Advanced Peripheral Bus (APB), AMBA High-performance Bus (AHB), Advanced eXtensible Interface (AXI), do not feature an explicit timeout mechanism and retrofitting timeouts onto legacy IP is prohibitively expensive. Without a proper timeout monitor, a system can easily stall and breakdown without any means to recover from a timeout.

When providing a fault-tolerant bus designed to tolerate a timeout fault, it is also important for an interconnect data bus to continue to comply with other properties such as atomicity, consistency, isolation, and durability (ACID) to guarantee that transactions are being processed reliably even in the presence of a timeout fault.

A Hardware Safety Node: Dealing with Timeouts and Late Responses

To address the issue of timeouts in safety-critical interconnect data buses, several buses have been developed for flight-critical functions in aircraft and aircraft engines where a tightly scheduled architecture is provided. In such time-triggered bus architectures, a response is expected and scheduled according to a preassigned clock cycle to ensure reliability. A timeout can then be detected if a response does not return according to the schedule at the particular preassigned clock cycle. This system has a couple of downsides: the throughput of the bus is strictly dictated by the schedule and the static schedule of a time-triggered bus is rather inflexible.

To provide temporal response flexibility, many of the industry standard and proprietary buses allow arbitrary response latency (event-triggered). However, the arbitrary response latency makes it a challenge to know if and when a response is expected to return. To address this issue of timeout in an interconnect data bus having an arbitrary response latency, a hardware safety node is inserted between two partitions/segments of an on-chip bus hierarchy or network: an upstream (master) section and a downstream (slave) section. The upstream section can be connected to at least one or more masters, and the downstream section can be connected to at least one or more slaves. The safety node can arbitrate transactions received from the upstream section, and provide tolerance for faults occurring in the downstream section.

Broadly speaking, a bus hierarchy or bus network includes interconnected bus segments to which master(s) and/or slave(s) can attach or connect. Depending on the embodiment or application, the bus hierarchy or bus network can have different topologies. The upstream section of a bus hierarchy/network can encompass one or more bus segments upstream from the safety node, and the downstream section of a bus hierarchy/network can encompass one or more bus segments downstream from the safety node. The interconnected bus segments of a bus hierarchy or network enable the one or more masters to communicate with the one or more slaves (from one point of the bus hierarchy or network topology to another point of the bus hierarchy or network topology). A safety node can be inserted between two segments at any suitable point of the bus hierarchy or bus network. A bus hierarchy or bus network can include more than one safety node at different points of the bus hierarchy or bus network.

The safety node, during operation, forwards transactions from a selected master on the upstream section to one of the slaves on the downstream section. To handle timeouts, the safety node provides a (programmable) timeout monitor which detects if a transaction on the downstream section is taking an excessive time to respond. Without violating protocol on either subsection, the safety node then detaches the connection to the forwarded transaction, and allows the master to complete its transaction by returning a prearranged dummy/error response (or broadly referred herein as "a prearranged response"). The safety node then assumes the role of master and maintains the transaction on the downstream section, until such time as the downstream slave device responds, or the bus segment is reset. While the downstream bus section remains busy, the safety node rejects any subsequent access requests by any of the masters on the upstream section, together with a prearranged response, in such a way as to enable those masters to avoid deadlock or stall and to proceed with other processing, such as an error handler. Phrased differently, the safety node rejects any subsequent requests by any of the masters on the upstream section by transmitting or triggering an immediate dummy/error response (e.g., prearranged error response) to those subsequent requests, thus enabling these masters to avoid deadlock or stall.

By having a safety node which can monitor and survive a timeout condition, the safety node can handle timeouts in an interconnect data bus gracefully in safety-critical systems and provide a fault tolerance number of one (i.e., the number of tolerable faults/node failures in the interconnect data bus downstream from the safety node). In other words, the safety node tolerates a maximum number of one failure on the interconnect data bus. Moreover, the safety node assumes the role of the master once timeout is detected, waits for the transaction to complete on behalf of the master, and rejects any further transactions being issued downstream while being able to maintain a reliable transaction system.

This safety node solution has the advantage of being able to wait for a late or delayed response to a transaction, rather than simply aborting a transaction or resetting the system. Furthermore, the safety node is designed to be modular enough to support the timeout functionality using a standard bus without affecting other parts of the system, such as the masters, or requiring the masters to be a complex bus-interruptible processor.

The Prearranged Response

Effectively, the safety node provides a (programmable) timeout monitor for detecting a timeout condition for a transaction. If timeout has occurred, the safety node transmits or triggers a prearranged (dummy) response back to the master, which frees the upstream section master to avoid deadlock and perform subsequent transactions. Depending on the processor or protocol, the prearranged response to be used to free the master can vary. Generally speaking, responses to the master can include one or more of: "In-Band" responses within the legal bus protocol (which might include error, transaction-incomplete responses), Normal completion response, Partial completion response (a hybrid of the Normal completion and "In-Band" responses), and "Side-Band" responses by other signals not part of the bus, such as an error interrupt.

Some processors and protocols might not support an in-band error response, but only support an out-of-band or side-band response (interrupt). Some processors/protocols allow a 'Split' or 'Partially-complete' response, e.g. as part of a burst protocol. These might allow the processor to detach from the problematic timed-out transaction and do something else. This 'Partial' response can be prearranged by programming. Similarly, some processors allow a 'Retry', which can be considered a 'Split' with nothing completed yet, which can also be prearranged by programming. In-band and side-band responses can be used individually and/or together.

Generally speaking, a response within the protocol is a legal slave response which allows the master to complete the current transaction legally within the master protocol, and may be any of: an error response (indicating the transaction was unsuccessful), a partial-completion response (indicating the transaction was partially completed and may have been split into a complete part and an incomplete part), or a normal-completion response. To address different processors/protocols, the safety node can be programmed or configured to provide/transmit/trigger the appropriate prearranged response, e.g., for freeing the upstream master. The prearranged response can include of either or both of (a) in-band response signaling within the bus protocol, and (b) side-band response outside the bus protocol, such as an interrupt. For instance, if a normal-completion in-band response is issued (with a dummy response or a normal response received after the transaction has timed out), the in-band response can be accompanied by a side-band response (e.g., error interrupt) so that the master is notified of the timeout.

System Overview

FIG. 1 is a simplified schematic diagram illustrating an exemplary processor-based system having a safety node, according to some embodiments of the disclosure. The system 100 (on-chip) is an integrated circuit that comprises a digital part 102. The digital part 102 can include a plurality of masters (processors), e.g., master 104, and master 106, configured to issue transactions to a plurality of slaves (peripherals), e.g., slave 108, slave 110, slave 112, and slave 114. Generally speaking, the master and slave relationship is a model of communication where one device/component or process has unidirectional control over one or more other devices/components. In some systems a master is elected from a group of eligible devices, with the other devices acting in the role of slaves. In this illustrative example, different clocks may be used within digital part 102.

In some embodiments, master 104 may be a microprocessor configured to supervise (or monitor) the operations of master 106 serving as the main control processor. Although only master 104 and master 106 are shown, the digital part 102 may include further master processors. Likewise, although only slave 108, slave 110, slave 112, and slave 114 are shown, the digital part 102 may include further slave peripherals.

The plurality of masters and slaves are interconnected in a network of communication links called an interconnect data bus (e.g., illustrated as having bus segments 116a and 116b) to allow for transactions to be issued from any one of the masters to a selected one of the slaves (e.g., any one of slave 108, slave 110, slave 112, and slave 114), and for responses to be transmitted from the selected slave to the master that issued the transaction. These transactions typically allow masters, e.g., to command a slave to perform an operation, to read/write to a memory element, etc. Furthermore, a slave can respond to a transaction with data, or a message which indicates a completion of a transaction. In some cases, slaves may also respond to a transaction with an error message to indicate that a transaction cannot be completed. In some cases, slaves may also respond to a transaction with a partial-completion message which indicates that a transaction has been partly completed and partly not completed, in response to which masters in some cases may be freed to perform other tasks. In some cases, slaves may respond to a transaction with a side-band signal outside the bus protocol, such as an interrupt, in combination with a response within the bus protocol which allows the master to be free to perform other tasks.

In this particular example (not intended to be limiting), the system can include an analog part 118 (e.g., an analog front end (AFE)). The analog part 118 can include analog electronics, e.g., AFE 120, and AFE 122, for providing an analog interface between the digital part 102 and components external to system 100 (such as sensors and other types of analog circuitry or mechanical components outside of system 100).

Lastly, the digital part 102 includes a safety node 124. The safety node 124 can include an upstream part 126, a downstream part 128, a timeout monitor 132, and one or more registers 130. A safety node is provided to monitor and survive a timeout on an interconnect data bus, specifically, a timeout on a bus segment downstream from the safety node. The upstream part 126 may interface with (or communicably connects to) an upstream section of a bus hierarchy or network (e.g., bus segment 116a) connected to one or more masters (e.g., master 104). The downstream part 128 may interface with (or communicably connects to) a downstream section of the bus hierarchy or network (e.g., bus segment 116b) connected to one or more slaves (e.g., slave 112, and slave 114).

In this example shown in FIG. 1, the safety node 124 serves as one of the masters for bus segment 116b (the other master is master 106). The safety node 124 monitors for failures in the bus segment 116b, slave 112, and slave 114. In other words, safety node 124 provides protection for faults occurring downstream of safety node 124. Masters, e.g., master 104 on bus segment 116a upstream from the safety node 124, must go through safety node 124 first before the masters upstream from the safety node 124 can communicate with the slaves connected downstream from safety node 124, e.g., slaves 112 and 114 on bus segment 116b. In this example, master 104 is protected against failures downstream from safety node 124. Note that master 104 remains a master for slaves 108 and 110 on bus segment 116a, and master 104 can communicate with the (local) slaves 108 and 110 without having to communicate through safety node 124 or interference from master 106. But the communication from master 104 to slave 108 and slave 110 does not benefit from the protection of safety node 124.

The safety node 124, e.g., the timeout monitor 132 therein, forwards a first transaction from a first master (e.g., master 104) on the upstream section to a first slave (e.g., any one of slave 112, and slave 114 on bus segment 116b) on the downstream section. The timeout monitor 132 may monitor the interconnect data bus (e.g., bus segment 116b) to determine if the first slave does not respond within a timeout period. If the first slave does not respond within the timeout period (e.g., in response to the lapse of the timeout period and no response has been received), the safety node (e.g., the timeout monitor 132) can transmit or trigger a prearranged (dummy/error) response to the first master (via the upstream part 126 or another interface) to allow the first master to complete the first transaction, and maintain the first transaction in the downstream section by waiting for the first slave to respond.

The safety node 124 can include one or more registers 130 in its hardware to maintain state information of the safety node (through one or more bits or states), the timeout monitor, and/or the interconnect data bus 116. The timeout monitor 132 can be configured to set values for at least some of the one or more registers 130. For instance, the one or more registers may include one or more of the following: a timeout monitor register for indicating whether the safety node is enabled or not enabled to monitor timeout on the interconnect data bus; a timeout interrupt register for indicating whether a timeout interrupt signal is active or inactive; a timeout error register for indicating whether a timeout has occurred on the interconnect data bus; and a timeout count register for setting a (user) programmable length of the timeout period. Examples of the one or more registers 130 are explained in further detail with FIGS. 6-8.

Besides providing a timeout monitor, the safety node 124 can also provide support for reliable transactions such as peripheral write-only or access (read/write) protection on a per-master basis. For instance, the safety node 124 can provide write protect registers assigned to each peripheral to disable write access from a given master, or access protect registers assigned to each peripheral to disable read access from a given master. Another feature of the safety node may include locks for locking the write protect registers and/or access protect registers.

Figure 2:
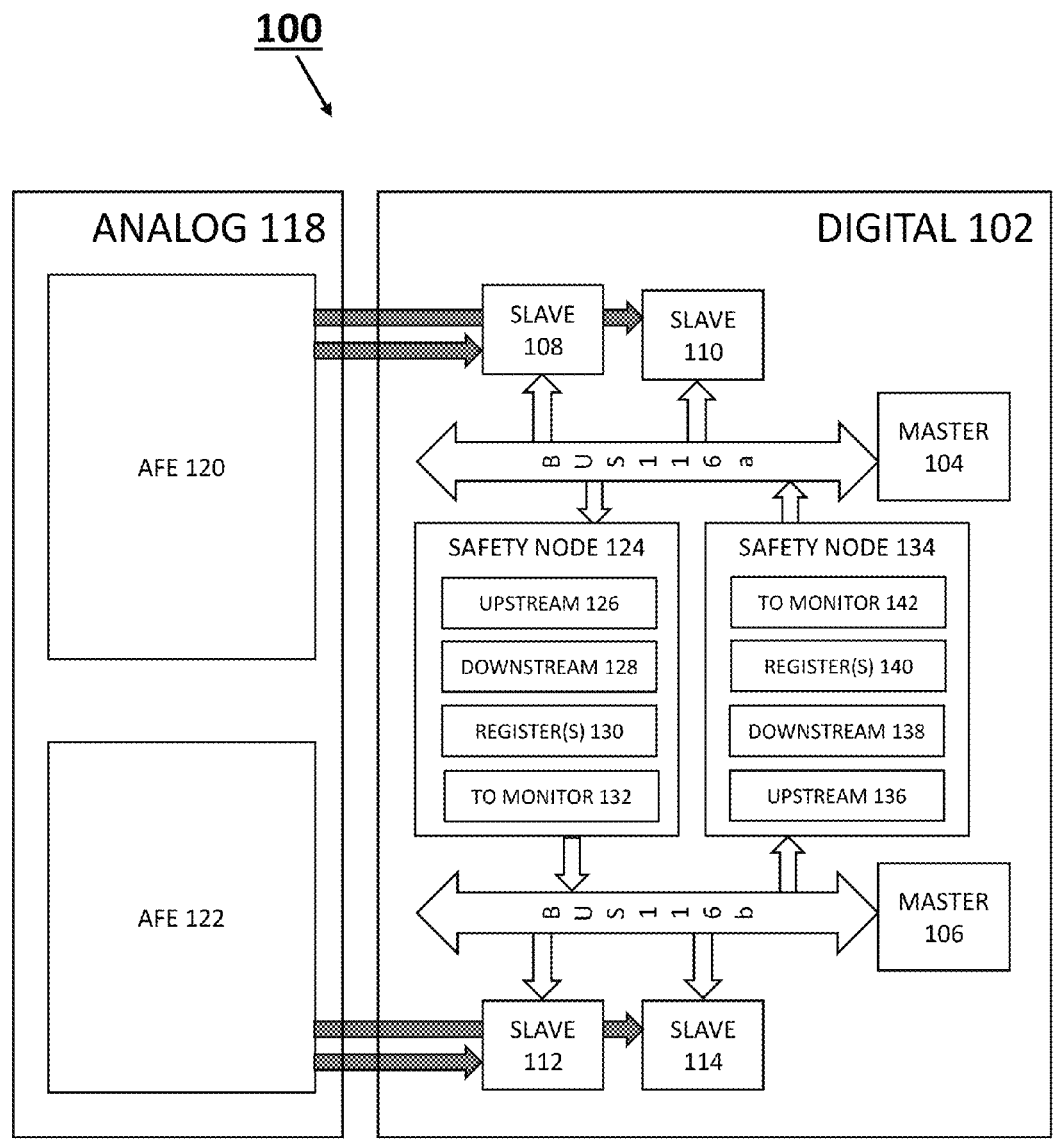
FIG. 2 is a simplified schematic diagram illustrating an exemplary processor-based system having two safety nodes, according to some embodiments of the disclosure.
Figure 3:
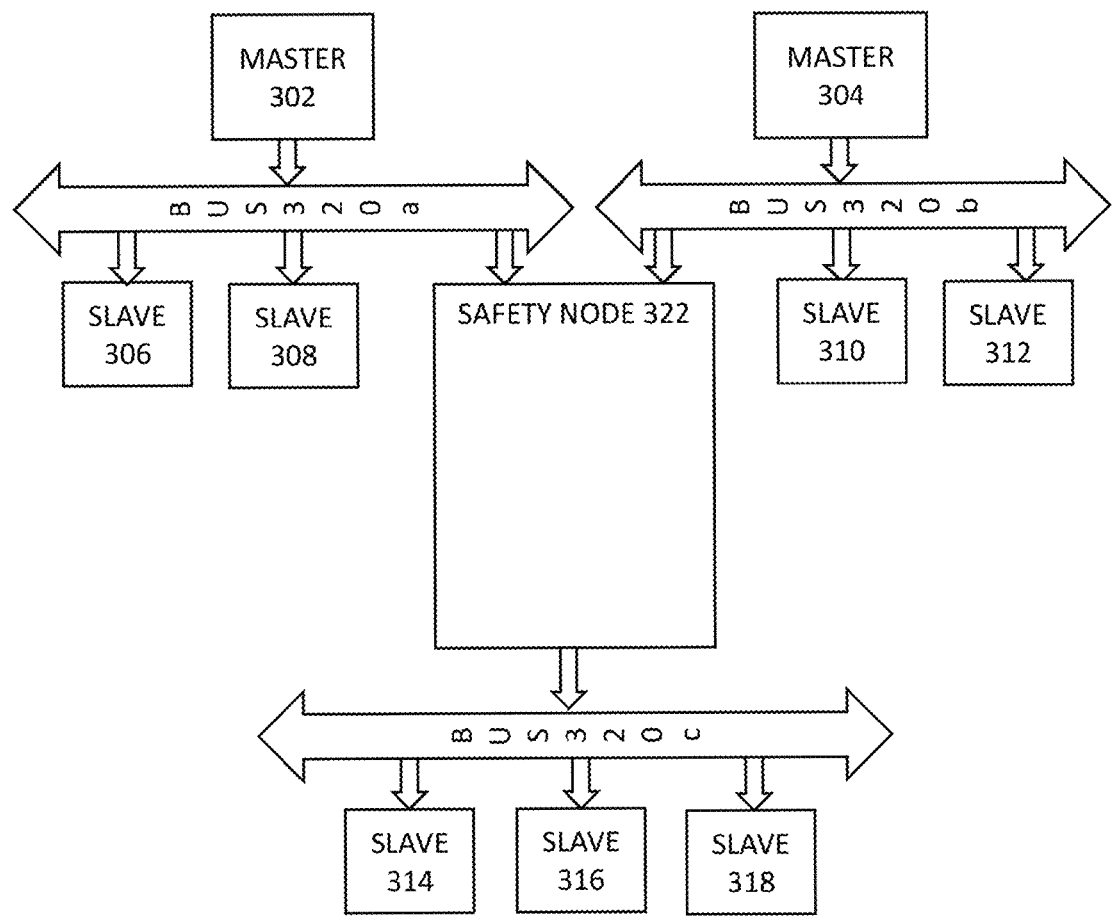
FIG. 3 is a simplified schematic diagram showing an exemplary interconnect bus hierarchy or network having a safety node, according to some embodiments of the disclosure.
Figure 4:
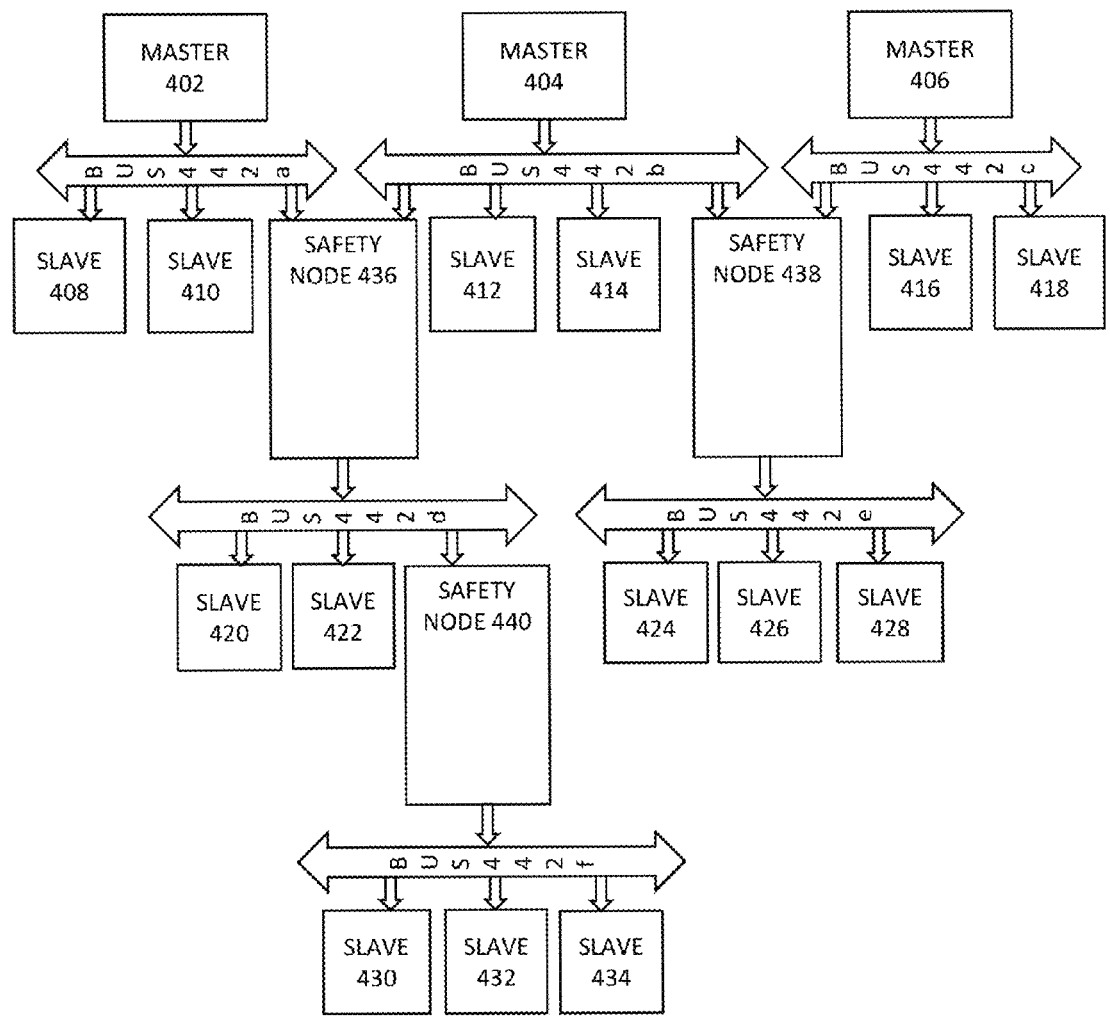
FIG. 4 is a simplified schematic diagram showing another exemplary interconnect bus hierarchy or network having a plurality of safety nodes, according to some embodiments of the disclosure.

The topology of the interconnect bus hierarchy/network of FIG. 1 is not intended to be limiting to the disclosure. For instance, the interconnect bus hierarchy/network of the present disclosure can include bus segments interconnected in other suitable ways with different placements of masters and slaves in the interconnect bus hierarchy/network (FIGS. 2-4 shows just some of the other possibilities). In some embodiments, a safety node can be the sole master of a bus segment (i.e., the interconnect bus hierarchy/network downstream from the safety node connects to slaves only). In some embodiments, a safety node can arbitrate access to a bus segment among multiple masters (i.e., the safety node can receive, among multiple masters, transactions targeted for one of the slaves downstream from the safety node). In some embodiments, a safety node can serve as one of the masters for a bus segment. In some embodiments, a safety node's upstream part can be connected to more than one bus segment (which can be connected to more than one master). In some embodiments, a safety node's downstream part can be connected to more than one bus segment (which can be connected to more than one slaves)

Bidirectional Safety in an Interconnect Bus

As described in relation to FIG. 1, safety node 124 protects against failures occurring downstream on bus segment 116b for a master that is upstream from safety node 124 (but not for failures occurring upstream on bus segment 116a). Thus, safety node 124 is unidirectional. To protect other parts of the bus hierarchy or network, more safety nodes can be added to the interconnect bus hierarchy/network. FIG. 2 is a simplified schematic diagram illustrating an exemplary processor-based system having two safety nodes: safety node 124 and safety node 134. If master 106 is to be protected from failures occurring on bus 116a, slave 108, and slave 110, safety node 134 can be provided.

In this example, the safety node 134 (similar to safety node 124) can include an upstream part 136, a downstream part 138, a timeout monitor 142, and one or more registers 140. The safety node 134 can monitor and survive a timeout on an interconnect data bus, specifically, a bus segment downstream from safety node 134. In this case, safety node 134 monitors bus segment 116a for faults occurring on bus segment 116a, slave 108, and slave 110. The upstream part 136 may interface with (or communicably connects to) an upstream section of a bus hierarchy (e.g., bus segment 116b) connected to one or more masters (e.g., master 104). The downstream part 138 may interface with (or communicably connects to) a downstream section of the bus hierarchy (e.g., bus segment 116a) connected to one or more slaves (e.g., slave 108, slave 110).

The principles of the safety node 134 are as follows. The safety node operates in a similar fashion as safety node 124, but in the opposite direction. In this example shown in FIG. 2, the safety node 134 serves as one of masters (the other master is master 104) for bus segment 116a to monitor for failures in the bus segment 116a, slave 108, and slave 110. In other words, safety node 134 provides protection for faults occurring downstream of safety node 134. Masters, e.g., master 106 on bus segment 116b upstream from the safety node 134, must go through safety node 134 first before the masters upstream from safety node 143 can communicate with the slaves connected downstream from safety node 134, e.g., slaves 108 and 110 on bus segment 116a. In this example, master 106 is protected against failures downstream from safety node 134. Note that master 106 remains a master for slaves 112 and 114 on bus segment 116b, and master 106 can communicate with the (local) slaves 112 and 114 without having to communicate through safety node 134 or interference from master 104. But the communication from master 106 to slave 112 and slave 114 does not benefit from the protection of safety node 134.

The safety node 134, e.g., the timeout monitor 142 therein, forwards a first transaction from a first master (e.g., master 106) on the upstream section to a first slave (e.g., any one of slave 108, and slave 110 on bus segment 116a) on the downstream section. The timeout monitor 142 may monitor the interconnect data bus (e.g., bus segment 116a) to determine if the first slave does not respond within a timeout period. If the first slave does not respond within the timeout period, the safety node (e.g., the timeout monitor 142) can transmit or trigger a prearranged (dummy/error) response to the first master (via the upstream part 136 or some other interface with the first master) to allow the first master to complete the first transaction, and maintain the first transaction in the downstream section by waiting for the first slave to respond.

It is noted that FIG. 2 serves to illustrate that a plurality of safety nodes can be provisioned to protect faults in different parts of a bus hierarchy or bus network. In general, interconnect bus hierarchy/network topologies where the safety node(s) can be used are not limited to the topologies as shown herein. Depending on the needed amount of fault tolerance of the system, where fault tolerance is needed, and the topology of the bus hierarchy or network, the placement of the safety node(s) can vary.

Hierarchy/Network of Interconnect Bus Segments and Safety Nodes

The safety node can be provided in the processor based system within a variety of hierarchies or network topologies. In an example, a safety node can arbitrate transactions from one of a plurality of masters upstream from the safety node towards one or more slaves downstream from the safety node. FIG. 3 is a simplified schematic diagram showing an exemplary interconnect bus hierarchy or network having a safety node, according to some embodiments of the disclosure. In this example, the processor-based system includes master 302, master 304, slave 306, slave 308, slave 310, slave 312, slave 314, slave 316, and slave 318. While a certain number of slaves are shown in this example, it is envisioned that other numbers of slaves can be provided within this architecture and hierarchy.

Bus segment 320a interconnects master 302 and its (local) slave 306 and slave 308. Bus segment 320b interconnects master 304 and its (local) slave 310 and slave 312. Bus segment 320c interconnects safety node 322, slave 314, slave 316, and slave 318. In this illustration, the safety node 322 has an upstream section which interfaces with two bus segments (bus segment 320a and 320b). Furthermore, the safety node 322 serves as a sole master of slave 314, slave 316, and slave 318.

In this hierarchy/network, master 302 is a master of bus segment 320a and can issue transactions to slave 306 and slave 308 without interference from other masters or the safety node 322. But master 302 is not protected from faults in slave 306 and slave 308 by safety node 322. Similarly, master 304 is a master of bus segment 320b and can issue transactions to slave 310 and slave 312 without interference from other masters or the safety node 322. But master 304 is not protected from faults in slave 306 and slave 308 by safety node 322. If either master 302 or 304 wishes to issue a transaction to slave 314, slave 316, and slave 318 on bus segment 320c, the transaction must go through safety node 322 first. In this manner, the safety node 322 can operate as described herein to protect either master 302 or master 304 from faults occurring on bus segment 320c, slave 314, slave 316, and slave 318 (faults downstream from safety node 322).

Extending the topology illustrated in FIG. 3, a "nested" interconnect hierarchy or a more complex interconnect bus network is envisioned, illustrating that the functionality of the safety node is extensible. A "nested" hierarchy can allow one or more safety nodes to be placed downstream from another safety node, or allow a safety node to be placed downstream from one or more safety nodes. FIG. 4 is a simplified schematic diagram showing another exemplary interconnect bus hierarchy or network having a plurality of safety nodes, according to some embodiments of the disclosure. The example FIG. 4 illustrates that the safety nodes can be provisioned within an interconnect bus hierarchy/network in any suitable manner, e.g., to meet fault tolerance requirements. By using a plurality of safety nodes, different safety zones can be provisioned in an interconnect bus hierarchy/network, and promote compartmentalization of the system. The safety zones can help isolate faults within a system, and/or prevent faults from propagating to other parts of the interconnect bus hierarchy/network, and increases minimum system availability of a fault tolerant system.

In this example, the processor based system includes master 402, master 404, master 406, slave 408, slave 410, slave 412, slave 414, slave 416, slave 418, slave 420, slave 422, slave 424, slave 426, slave 428, slave 430, slave 432, slave 434, safety node 436, safety node 438, and safety node 440.

Bus segment 442a interconnects master 402 and its (local) slave 408, and slave 410. Bus segment 442b interconnects master 404 and its (local) slave 412, and slave 414. Bus segment 442c interconnects master 406 and its (local) slave 416, and slave 418. In this hierarchy, a master (being a master of the bus segment to which it is connected) can issue transactions to its local slaves without interference from other masters or the safety nodes in the system. But that master is not protected from faults in that bus segment and its local slaves.

In this hierarchy, if master 402 or master 404 is to issue a transaction to any slave downstream from safety node 436 (e.g., slave 420, slave 422, slave 430, slave 432, and slave 434), the transaction must go through safety node 436 first. For transactions being issued by master 402 or master 404 to any (target) slave downstream from safety node 440 (e.g., slave 430, slave 432, and slave 434), the transaction must go through safety node 436 first, then through safety node 440 before reaching the (target) slave. In this manner, master 402 and master 404 are protected by safety node 436 from faults occurring downstream from safety node 436 (i.e., in bus segment 442d, slave 420, slave 422). By virtue of having safety node 440 downstream from safety node 436, master 402 and master 404 are also protected (by safety node 436 and safety node 440) from faults occurring downstream in any one of: the safety node 440, bus segment 442f, slave 430, slave 432, and slave 434.

Furthermore, if master 404 or master 406 is to issue a transaction to any slave downstream from safety node 438 (e.g., slave 424, slave 426, and slave 428), the transaction must go through safety node 438 first. In this manner, master 404 and master 406 are protected by safety node 438 from faults occurring downstream from safety node 438 (i.e., in bus segment 442e, slave 424, slave 426, and slave 428).

In an alternative embodiment, safety node 440 have an upstream part that interfaces with bus segment 442e. This topology would enable master 404 and master 406 to communicate to slave 430, slave 432, and slave 434 via safety node 440. Furthermore, safety node 440 (as the sole master of slave 430, slave 432, and slave 434) would protect master 404 and master 406 from faults occurring downstream from safety node 440. This shows yet another one of many possible embodiments where safety nodes can be placed within an interconnect bus hierarchy/network to provide desired fault tolerance in the system.

Method Overview

Figure 5:
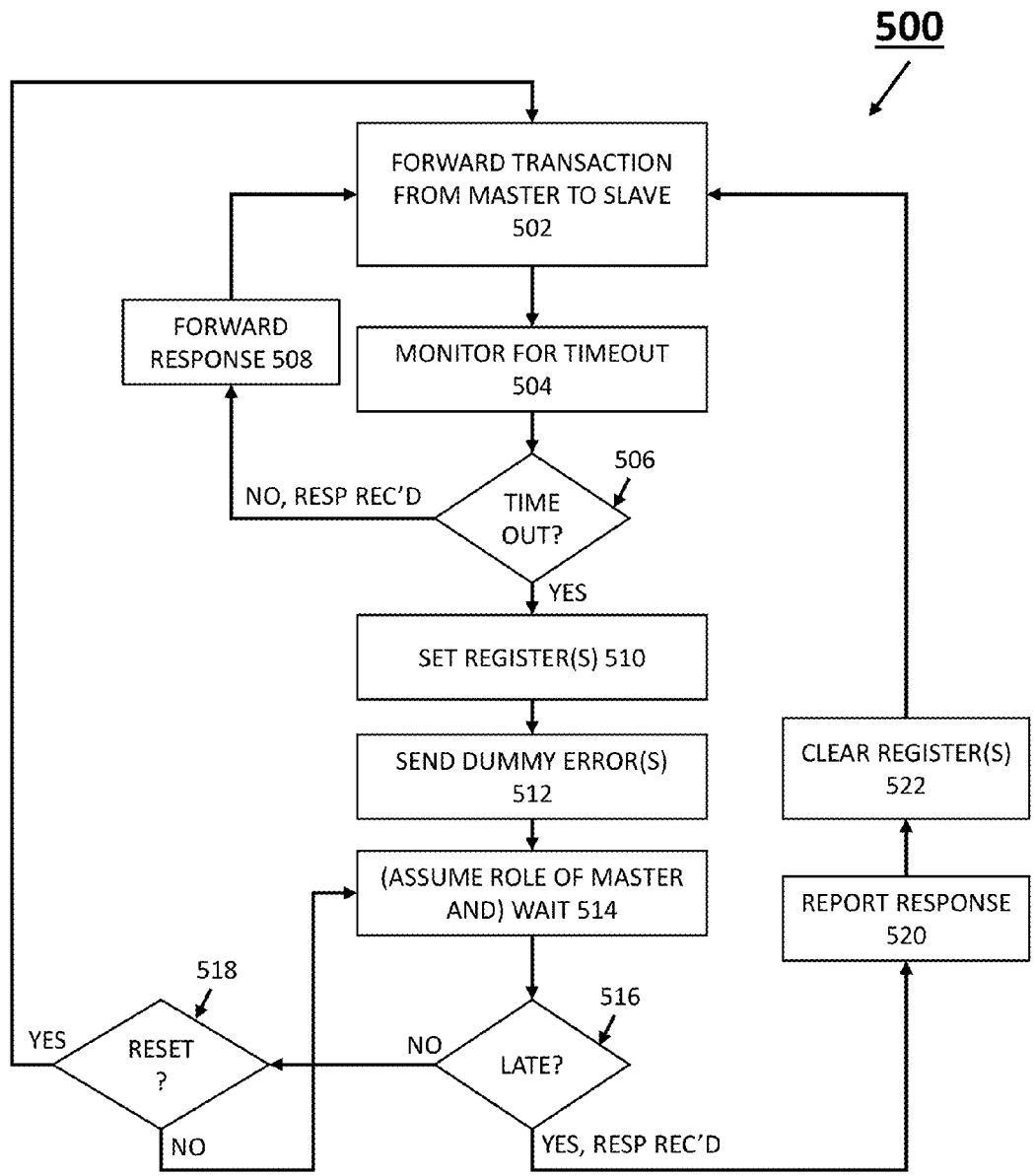
FIG. 5 is a simplified flow diagram illustrating a procedure for monitoring and surviving a timeout on an interconnect data bus by a safety node, according to some embodiments of the disclosure.

FIG. 5 is a simplified flow diagram illustrating a procedure for monitoring and surviving a timeout on an interconnect data bus, according to some embodiments of the disclosure. In particular, the method for monitoring and surviving a timeout on an interconnect data bus is performed by a safety node, such as, the safety node of FIG. 1. The safety node may include an upstream part interfacing with an upstream section of a bus hierarchy/network connected to one or more masters and a downstream part interfacing with a downstream section of the bus hierarchy/network connected to one or more slaves.

The method includes forwarding a first transaction from a first master on the upstream section to a first slave on the downstream section (box 502). The safety node, being inserted between the upstream section and the downstream section, serves to forward transactions and responses exchanged between masters and slaves.

The safety node monitors the interconnect data bus (box 504) to determine if the first slave does not respond within a timeout period (e.g., checks for the timeout condition in diamond 506). For instance, the safety node listens on downstream portion for a response from the first slave.

In some embodiments, the safety node has a timeout monitor register for indicating whether the safety node is enabled or not enabled to monitor time out on the interconnect data bus (or whether the timeout monitor of the safety node is enabled or not enabled). Accordingly, the safety node may monitor the interconnect data bus based on the state indicated by the timeout monitor register.

In some embodiments, the length of the timeout period is configured by a programmable timeout count register of the safety node. A clock for counting down the timeout period may be provided with the timeout monitor to provide a timer for the timeout period. The timeout period may be defined in terms of the number of clock cycles (e.g., a value stored in a timeout count register).

Having a configurable timeout period is advantageous for several reasons. For example, the timeout counter can be programmed to represent a time longer than the longest normal latency expected on the bus, but shorter than the minimum required system response time to an error condition. This value may vary from system to system and is valuable to have under user control. In another example, the hardware may initialize the timeout counter with one of several programmable values where the selection depends on the type of master or the addressed slave, for example, a longer timeout for a slow device and a shorter timeout for a faster device. The number of programmable register options is not limited, in principle.

If the first slave responds within the timeout period ("NO, RESP REC'D" arrow of diamond 506), the safety node ensures proper and normal operation by forwarding the response to the first master (box 508).

If the first slave does not respond (or no response has been observed) within the timeout period ("YES" arrow of diamond 506), one or more of the following can occur to indicate that the safety node (or the interconnect data bus) has entered a timeout state or observed a timeout error. In some embodiments, the safety node sets the value of a timeout interrupt register to indicate that a timeout interrupt signal is active (box 510). In some embodiments, the safety node generates or raises the timeout interrupt signal (e.g., in addition to setting the value of the timeout interrupt register). In some embodiments, the safety node sets the value of a timeout error register to indicate that a timeout has occurred on the interconnect data bus (box 510).

If the first slave does not respond (or no response has been observed) within the time out period ("YES" arrow of diamond 506), the safety node transmits or triggers a prearranged (error or dummy) response to the first master to allow the first master to complete the first transaction (box 512). This ensures that the first transaction is "completed" from the point of view of the first master even though the first transaction received a prearranged response.

Furthermore, if the first slave does not respond (or no response has been observed) within the timeout period, the safety node assumes the role of the first master and waits for a response on behalf of the first master (box 514). Specifically, the safety node maintains the first transaction in the downstream section by waiting for the first slave to respond. In other words, the safety node survives after the timeout (does not get reset). This survival aspect of the safety node of maintaining the first transaction in the downstream section may include waiting for the first slave to respond to the first transaction until either (1) the first slave responds to the first transaction ("YES, RESP REC'D" arrow of diamond 516), or (2) the bus is reset ("YES" arrow of diamond 518).

Once the safety node has entered the timeout state, the safety node may receive, via the upstream part interfacing with the upstream section of the interconnect data bus, a second transaction from the second master on the upstream section (or other transactions from other masters). To prevent further faults and ensure continued operation of the system, the safety node can transmit or trigger, e.g., using the timeout monitor (via the upstream part or some other interface with the second master) a prearranged (dummy) response (e.g., including one or more of error, partial, normal, and/or side-band interrupt) to the second master in response to the second transaction (or any other subsequent transactions being issued to the slaves) (box 512). This allows the safety node to reject these downstream transactions in the presence of a timeout error.

Once the safety node has entered the timeout state, if the safety node receives a first response to the first transaction via the downstream part interfacing the downstream section of the interconnect data bus ("YES RESP REC'D" arrow of diamond 516), the safety node reports the response (box 520) to the first master. As the bus protocol only allows one and only one response per transaction, the safety node can report to the first master of the response via a manner outside of the bus protocol, e.g., by an interrupt and/or by a status bit in a register, indicating that the downstream bus segment has recovered. The response received may be captured in a register for subsequent examination by the first master.

Furthermore, the safety node may clear registers to indicate that the safety node is no longer in a timeout state. In some embodiments, in response to receiving the first response, the safety node resets the timeout interrupt register (box 522). In some embodiments, the safety node, resets a timeout interrupt register to clear the timeout interrupt signal (box 522), wherein the timeout interrupt register indicates whether the timeout interrupt signal is active. In some embodiments, the safety node, in response to receiving the first response, resets the timeout error register (box 522).

When the safety node is in the timeout state, the outstanding transaction will be terminated by a prearranged dummy response on the master side. After that, bus transactions on the bus segment upstream from the safety node will operate as normal. All other new master interface transactions being issued downstream from the safety node (i.e., going through the safety node) will receive an error response immediately. If a belated slave response is received, a timeout error register is cleared, and the master will be notified outside of the bus protocol.

Note that if the timeout transaction is a write, there is a potential mismatch between the master and slave view of the transaction. The master receives an error at the end of timeout period, while the slave may complete the write after the timeout period expires. Care must be taken in resolving this potential mismatch. There are several ways to handle this situation. In one example, if the master attempts a write transaction but receives an error response, it can now execute an error handler. The application should assume that the outcome of the write is indeterminate, and take appropriate action to protect the system. In another example, if the write completes later after the timeout error, the safety node may use an interrupt or status indication (bit in a register) to notify the originating master. The handler for this indication may then take diagnostic or corrective action to determine the current state of the system and to take appropriate action to protect the system. Note that none of these error handlers are possible in systems without the safety node described herein, because normal bus protocol requires the upstream master to pend forever.

It is noted that the method as described in relation with the arrangement shown in the FIG. 5 is not intended to be limiting. Various parts of the method may be performed out of order, in parallel, and/or replaced by other suitable implementations of the method.

Safety Node Control Register(s)

Figure 6:
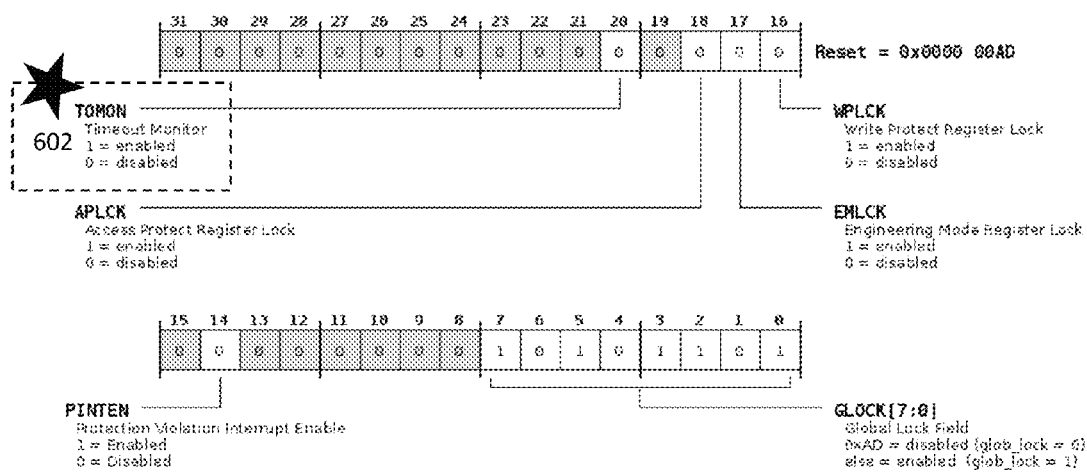
FIG. 6 is a diagram illustrating an exemplary control register of a safety node, according to some embodiments of the disclosure.

FIG. 6 is a diagram illustrating an exemplary control register of a safety node, according to some embodiments of the disclosure. In particular, this FIGURE illustrates a set of exemplary registers used for controlling the safety node ("SAFETY NODE CONTROL REGISTERS"). The set of registers includes 32 bits, but other number of bits may be used depending on the application and needs. Typically, these control bits are configured by software running on the masters (processors) at system initialization time. The most relevant control register for the present disclosure is the timeout monitor register 602 ("TOMON" for indicating whether the timeout monitoring function of the safety node is enabled or not). In this example, when the value is "1", the timeout monitor is enabled, and when the value is "0", the timeout monitor is not enabled. When the timeout monitor register is set (e.g., a 1-bit register at position 20 dedicated for storing the control bit), bus transactions on the downstream segment of the interconnect data bus is monitored for timeout error.

Other control registers may include one or more registers for enabling: access protect register locks, write protect register locks, protection violation interrupt enable, global lock field, etc.

Safety Node Status Register(s)

Figure 7:
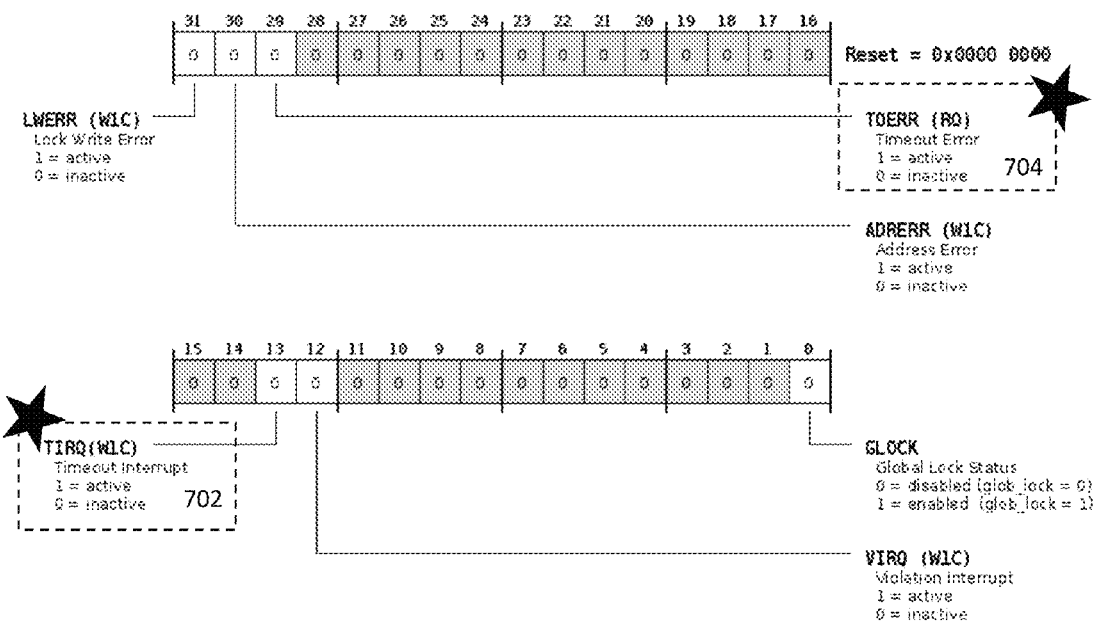
FIG. 7 is a diagram illustrating an exemplary status register of a safety node, according to some embodiments of the disclosure.

FIG. 7 is a diagram illustrating an exemplary status register of a safety node, according to some embodiments of the disclosure. In particular, this FIGURE illustrates a set of exemplary registers used for indicating various statuses of the safety node ("SAFETY NODE STATUS REGISTERS"). The set of registers includes 32 bits, but other number of bits may be used depending on the application and needs. The most relevant control registers for the present disclosure are the timeout interrupt register 702 ("TIRQ (W1C)" for indicating whether the timeout interrupt signal is active or inactive, write-one-clear) and the timeout error register 704 ("TOERR (RO) for indicating whether a timeout has occurred on the interconnect data bus, read only).

When the timeout interrupt register (e.g., a 1-bit register at position 13 dedicated for storing the status bit) is set as active, the value "1" indicates that a timeout violation has been detected and a timeout interrupt signal has been asserted (or is active). When the timeout interrupt register is set as inactive or has been reset, the value "0" indicates a timeout violation is no longer present and the timeout interrupt signal is not active. Timeout interrupt signals of the safety node may be write-one-cleared by setting the status bit of the timeout interrupt register.

When the timeout error register (e.g., a 1-bit register at position 29 dedicated for storing the status bit) is set as active, the value "1" indicates that a timeout has occurred on the interconnect data bus. The timeout error register is read only, and a value of "1" or an active value indicates a timeout transaction is in progress. This status bit is (self) cleared or reset when a late response is detected after the timeout period expired.

Other control registers may include one or more registers for indicating the status of: lock write error, address error, global lock status, violation interrupt, etc.

Safety Node Timeout Register

Figure 8:
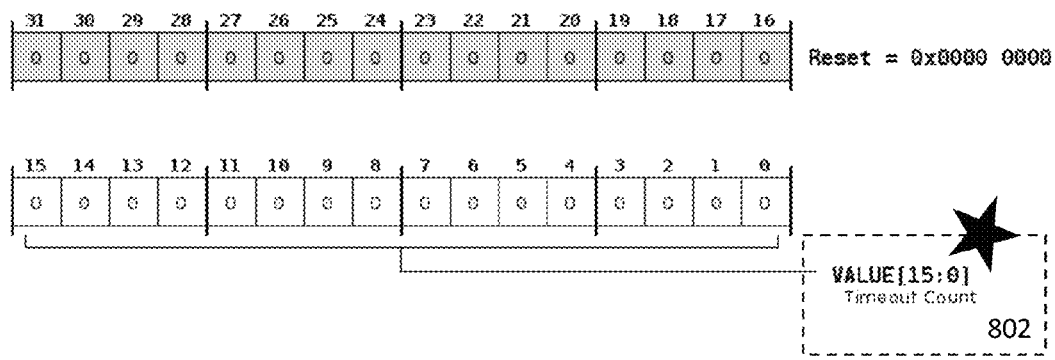
FIG. 8 is a diagram illustrating an exemplary timeout counter register of a safety node, according to some embodiments of the disclosure, according to some embodiments of the disclosure.

FIG. 8 is a diagram illustrating an exemplary timeout counter register of a safety node, according to some embodiments of the disclosure, according to some embodiments of the disclosure. One advantage of the safety node is the programmability of the timeout period. The length of the timeout period can be set by the value in the timeout count register 802. In this example, the timeout counter registers may include 32 bits, but other number of its may be used. 16 bits (positions 0 to 15 of the counter register) in this example are reserved for storing a timeout count value. The timeout count register enables the system to program the length of the timeout period, e.g., in terms of number of clock cycles, etc.

In some embodiments, if the timeout monitor register indicates that the safety node is enabled, an interrupt is generated (TIRQ) when the target endpoint does not respond before the timeout counter expires. If the timeout count register has a value of "0", a timeout interrupt signal is not generated. A read from the timeout count register returns the programmed value. Current count is not available for read.

Applications and Variations of the System and Methods

The safety node described herein have wide applicability in many types of systems where fault tolerance is desired. For example, safety nodes can be placed in an on-chip system between two (or more) subsystems, where subsystems can monitor the operations or state of each other (the two subsystems can be asymmetric or symmetric). By placing a safety node between these subsystems, protection can be provided for one subsystem against faults occurring in the other subsystem while allowing the two subsystems to communicate with each other. Without the use of safety nodes, a system designer would normally have to isolate the two subsystems from communicating with each other to provide fault tolerance, which can severely limit the functions of the system.

A plurality of sub-systems requiring good fault tolerance are often found in safety-critical applications such as (solar) photovoltaic inverter systems, and motor control systems. For instance, functional safety goals may be imposed in photovoltaic inverter systems requiring a safety mechanism that ensures proper operation of the system (or at least a part of the system) during the presence of a certain number of hardware faults (requiring a non-zero fault tolerant number). In the example of a solar panel inverter, the main control processor/master can perform many real time tasks while being responsible for moving around kilowatts of energy. If there is a fault, the fault can propagate to other parts of the system. Industrial regulations can require the solar panel inverter to meet certain safety requirements where the inverter must shut the system down or reduce capacity in the event of a hardware failure. For instance, a relay may need to be disconnected if a fault is detected. The safety node can provide tremendous utility by avoiding deadlock or stall and enabling masters to react properly (by performing a remedial action in the event of a hardware fault).

Broadly speaking, these safety-critical systems are required to survive a part of the system failing up to a certain percentage of coverage and perform a last ditch safety operation to protect the environment, people, property, equipment, etc. Conventional systems could attempt to provide fault tolerance by isolating all peripherals from other parts of the system in order to prevent faults from propagating to other parts of the system. But such systems have very little utility because modern/complex electronic systems rarely allow subsystems to operate independently in isolation. If safety nodes are used, the overall system effectively allows controlled sharing of peripherals and communication among masters and slaves, while providing desired fault tolerance.

Safety nodes allows the system to fail safely by alerting a master that a timeout condition has occurred by transmitting or triggering a prearranged (dummy/error) response and enabling a master to begin a fault handling procedure. Safety nodes can provide the advantage of allowing two subsystems to communicate while maintaining fault isolation and provide a fail-safe system. Systems utilizing the safety nodes can recover from hardware faults (i.e., having a great degree of survivability) while having the benefit of interconnecting the two systems.

Another advantage is the ability to use safety nodes in an interconnect bus hierarchy/network to reduce the Common Cause Failures (CCF) fraction of the bus. When there are a plurality of subsystems (or processors), there can be a number of CCFs which can affect the plurality of systems at the same time due to the logic shared between the subsystems. Safety nodes can increases interoperability while reducing the CCF fraction of the system, because the isolation provided by safety nodes can prevent faults from affecting multiple masters at the same time (thereby reducing CCF contribution).

Industries which can greatly benefit from the applicability of the safety nodes envisioned by the disclosure include: automotive, motor control industrial, energy transmission and distribution, solar systems, uninterruptable power supplies, healthcare, transportation, utilities, infrastructure, aerospace, etc.

Within the context of the disclosure and the claims, the term "bus hierarchy" and the term "bus network" encompasses both interconnect buses configured in a tree structure (where no loops exists), and interconnect buses configured as a network (where one or more loop may exists).

In the discussions of the embodiments above, the components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure.

In one example embodiment, any number of circuits of the FIG. 1-4 may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that the activities discussed above with reference to the FIGURES (such as FIG. 5) are applicable to any integrated circuits that involve processor-based electronics having an interconnect bus between masters and slaves, particularly those that can execute specialized software programs, or algorithms in safety-critical application, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Applications of the safety node of the present disclosure can involve automotive technologies for safety systems (e.g., stability control systems, driver assistance systems, braking systems, infotainment and interior applications of any kind).

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIG. 1 and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A safety node within an integrated circuit for monitoring and surviving a timeout on an on-chip interconnect data bus within the integrated circuit, the safety node comprising:
    an upstream part interfacing with an upstream section of a bus network of the on-chip interconnect data bus connected to one or more masters within the integrated circuit; and
    a downstream part interfacing with a downstream section of the bus network of the on-chip interconnect data bus connected to one or more slaves within the integrated circuit;
    wherein the safety node is configured to:
        forward a first transaction from a first master on the upstream section to a first slave on the downstream section;
        monitor the interconnect data bus to determine if the first slave does not respond within a timeout period; and
        if the first slave does not respond within the timeout period, transmit a prearranged response to the first master to allow the first master to complete the first transaction.

2. The safety node of claim 1, wherein the safety node is further configured to:
    if the first slave does not respond within the timeout period, maintain the first transaction in the downstream section by waiting for the first slave to respond.

3. The safety node of claim 1, wherein the safety node further comprises:
    a timeout monitor register for indicating whether the safety node is enabled or not enabled to monitor timeout on the on-chip interconnect data bus.

4. The safety node of claim 1, wherein the safety node further comprises:
    a timeout interrupt register for indicating whether a timeout interrupt signal is active or inactive.

5. The safety node of claim 1, wherein the safety node further comprises:
    a timeout error register for indicating whether a timeout has occurred on the on-chip interconnect data bus.

6. The safety node of claim 1, wherein the safety node further comprises:
    a timeout count register for setting a programmable length of the timeout period.

7. The safety node of claim 1, wherein the safety node is further configured to, if the first slave does not respond within the timeout period:
    receive, via the upstream part, a second transaction from a second master on the upstream section; and
    transmit a prearranged error response to the second master in response to the second transaction.

8. The safety node of claim 1, wherein the safety node tolerates a maximum number of one failure on the on-chip interconnect data bus.

9. A method for monitoring and surviving a timeout on an on-chip interconnect data bus by a safety node within an integrated circuit to provide a fault tolerance number of one, the safety node comprising an upstream part interfacing with an upstream section of a bus network of the on-chip interconnect data bus connected to one or more masters within the integrated circuit and a downstream part interfacing with a downstream section of the bus network of the on-chip interconnect data bus connected to one or more slaves within the integrated circuit, the method comprising:
    forwarding, by the safety node, a first transaction from a first master on the upstream section to a first slave on the downstream section;
    monitoring, by the safety node, the on-chip interconnect data bus to determine if the first slave does not respond within a timeout period; and
    if the first slave does not respond within the timeout period, transmitting by the safety node, a prearranged response to the first master to allow the first master to complete the first transaction.

10. The method of claim 9, further comprising:
    if the first slave does not respond within the timeout period, maintaining the first transaction in the downstream section by waiting for the first slave to respond.

11. The method of claim 10, wherein maintaining the first transaction in the downstream section by waiting for the first slave to respond comprises:
    waiting for the first slave to respond to the first transaction until either (1) the first slave responds to the first transaction, or (2) the on-chip interconnect data bus is reset.

12. The method of claim 9, further comprising, if the first slave does not respond within the timeout period:
    receiving, via the upstream part, a second transaction from a second master on the upstream section; and
    transmitting a prearranged error response to the second master in response to the second transaction.

13. The method of claim 9, wherein a length of the timeout period is configured by a programmable timeout count register of the safety node.

14. The method of claim 9, further comprising, if the first slave does not respond within the timeout period:
    setting the value of a timeout interrupt register to indicate that a timeout interrupt signal is active.

15. The method of claim 14, further comprising, after the timeout period:
  receiving a first response to the first transaction via the downstream part; and
  in response to receiving the first response, resetting the timeout interrupt register.

16. The method of claim 9, further comprising, if the first slave does not respond within the timeout period:
  generating a timeout interrupt signal.

17. The method of claim 16, further comprising, after the timeout period:
  receiving a first response to the first transaction via the downstream part; and
  in response to receiving the first response, resetting a timeout interrupt register to clear the timeout interrupt signal, wherein the timeout interrupt register indicates whether the timeout interrupt signal is active.

18. The method of claim 9, further comprising, if the first slave does not respond within the timeout period:
  setting the value of a timeout error register to indicate that a timeout has occurred on the on-chip interconnect data bus.

19. The method of claim 18, further comprising, after the timeout period:
  receiving a first response to the first transaction via the downstream part; and
  in response to receiving the first response, resetting the timeout error register.

20. A safety-critical integrated circuit comprising:
  at least a first master processor and a second master processor;
  one or more slave peripherals;
  a fault-tolerant on-chip interconnect data bus comprising an upstream section connected to at least the first master processor and the second master processor and a downstream section connected to the one or more slave peripherals; and
  a safety node having an upstream part interfacing with the upstream section and a downstream part interfacing with the downstream section, wherein the safety node is configured to:
    forward a first transaction from the first master processor on the upstream section to a first slave peripheral on the downstream section;
    monitor the on-chip interconnect data bus to determine if the first slave peripheral does not respond within a timeout period; and
    if the first slave peripheral does not respond within the timeout period, trigger a prearranged response to the first master processor to allow the first master processor to complete the first transaction.

* * * * *